Aug. 21, 1923.
L. P. VALIQUET
1,465,772
MOTOR DRIVE FOR TALKING MACHINES
Filed March 3, 1921    3 Sheets-Sheet 1
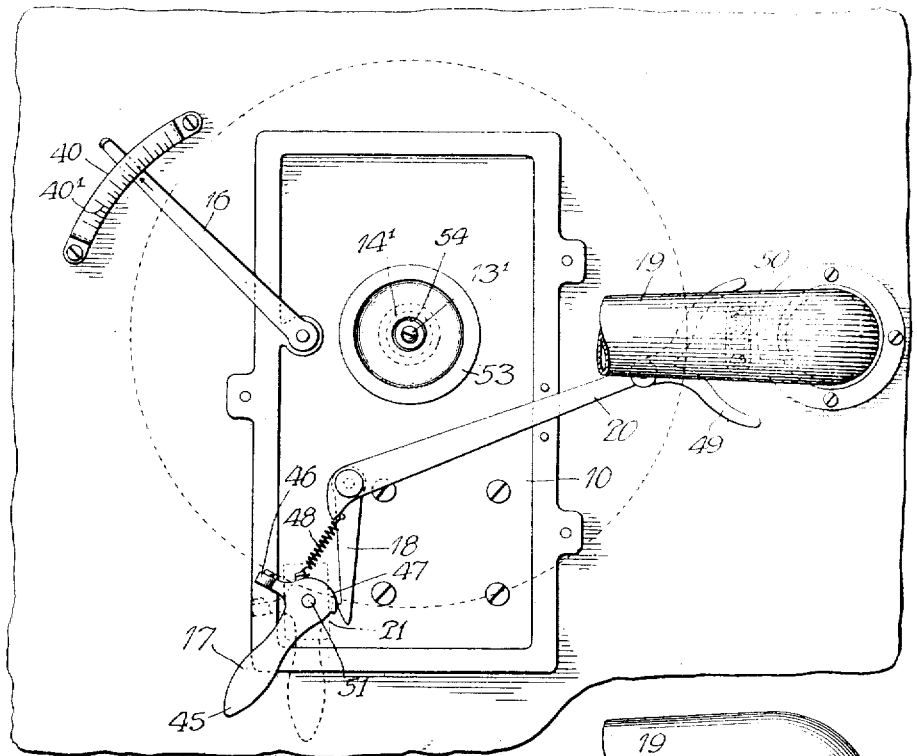
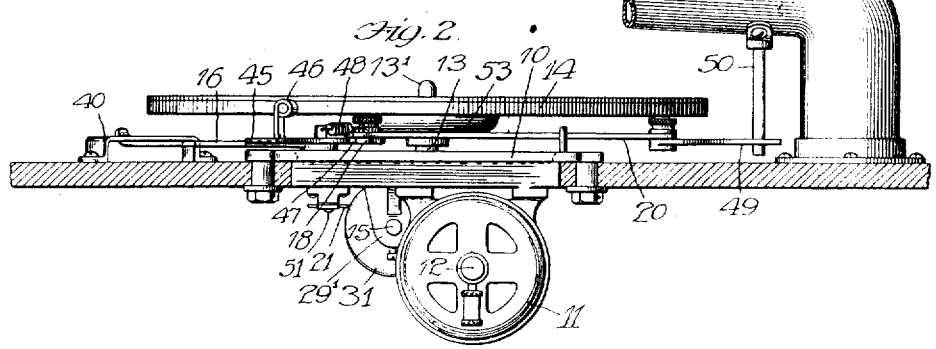
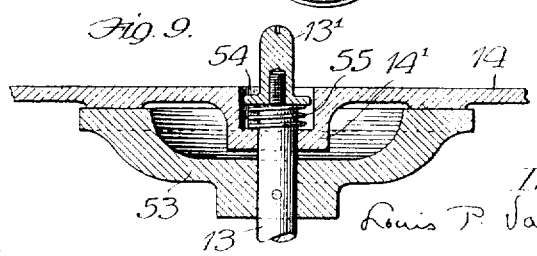

Aug. 21, 1923.
L. P. VALIQUET
1,465,772
MOTOR DRIVE FOR TALKING MACHINES
Filed March 3, 1921     3 Sheets-Sheet 2
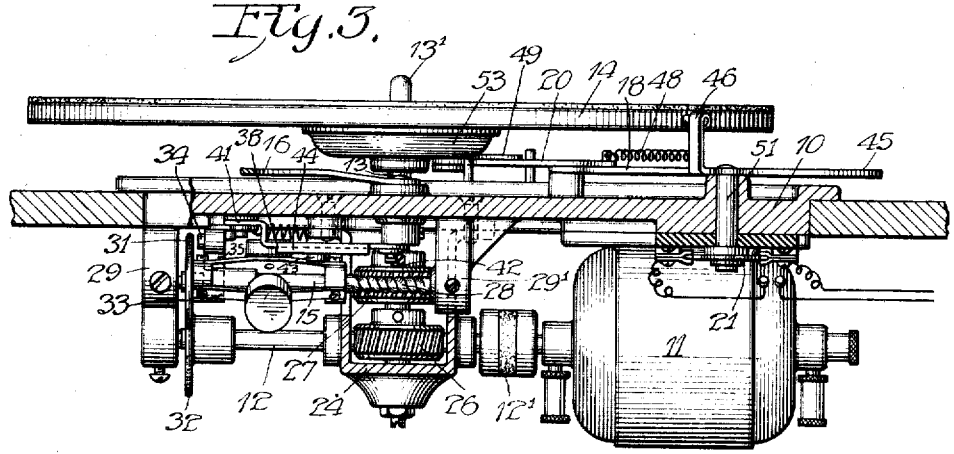
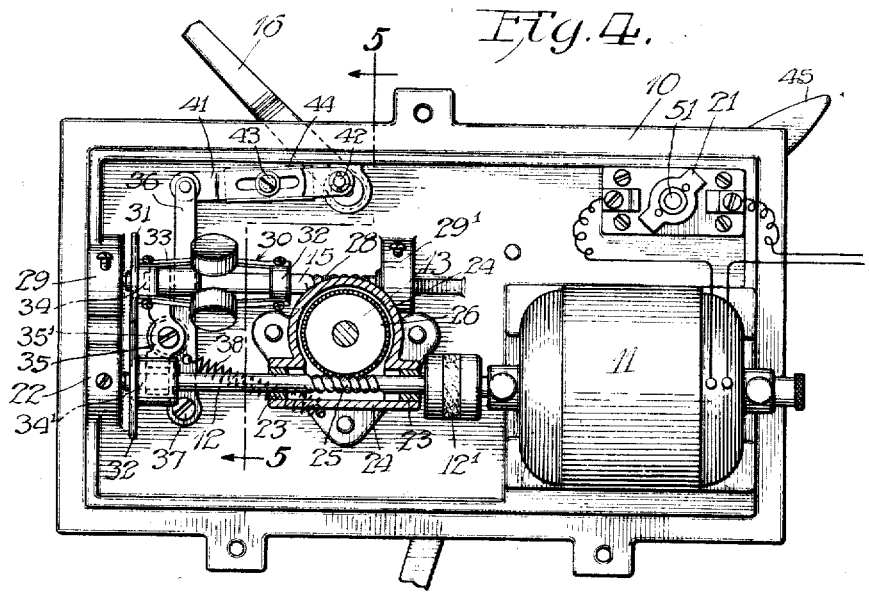

Aug. 21, 1923. 1,465,772
L. P. VALIQUET
MOTOR DRIVE FOR TALKING MACHINES
Filed March 3, 1921  3 Sheets-Sheet 3
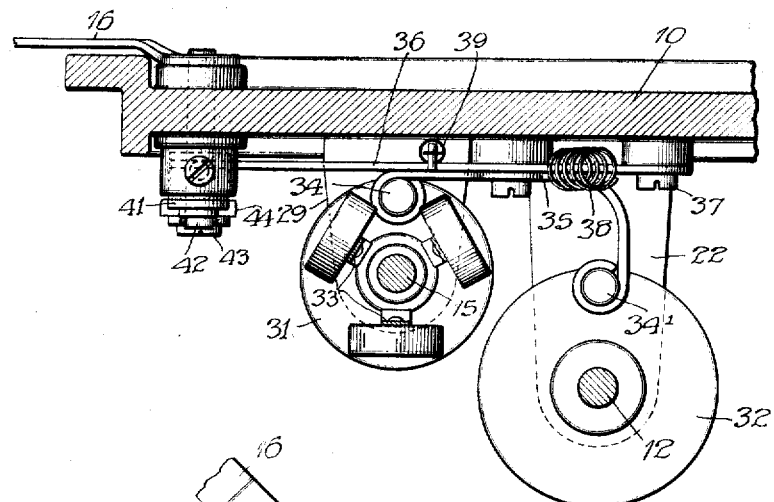
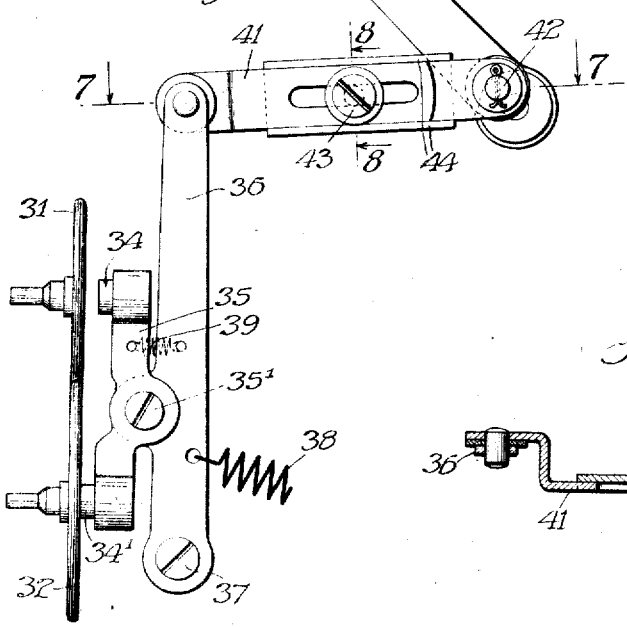
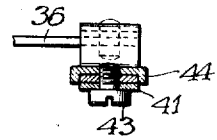
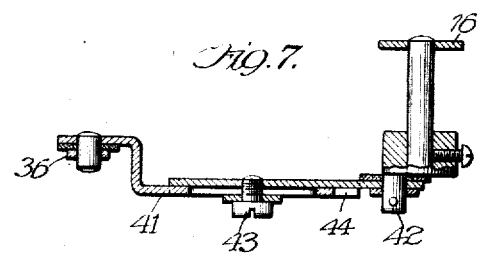
Witness
Martin H. Olsen
Inventor
Louis P. Valiquet
By Rector Hibben Davis & Macauley
Attys Patented Aug. 21, 1923.

1,465,772

UNITED STATES PATENT OFFICE.

LOUIS P. VALIQUET, OF CHICAGO, ILLINOIS.

MOTOR DRIVE FOR TALKING MACHINES.

Application filed March 3, 1921. Serial No. 449,404.

*To all whom it may concern:*

Be it known that I, LOUIS P. VALIQUET, a citizen of the United States, residing at Chicago, in the county of Cook and State of Illinois, have invented certain new and useful Improvements in Motor Drives for Talking Machines, of which the following is a specification.

My invention provides an improved motor-drive for talking machines and, in some of its features, has particularly to do with constructions wherein an electric motor is used as the source of power. It is understood that an electric motor may be employed to drive the shaft for the record-table, or the table itself, of a talking machine, and that the table-rotation must be speed-governed and that the operation of the machine must be readily controllable to start or stop it. But in attempting any mere substitution of a small electric motor for the customary spring motor of a disc-record talking machine one encounters many corelated difficulties and problems that have not heretofore been successfully solved.

The general object of my invention is to provide a commercially satisfactory, efficient, durable and inexpensive construction utilizing an electric motor as a power source and coordinating and improving the features of speed-governing and of starting and stopping control in such manner as to insure fully-satisfactory operation of the mechanism and its substantial "foolproofness" or protection from damage by careless operation.

Among the more detailed objects of my invention are, to provide a mounting and co-relation of the motor, gearing elements, regulating and governing parts, and turntable that will be at once functionally adequate and mechanically economical for quantity production; to provide highly efficient governing means for close, delicate and substantially instantaneous control of the turntable speed and its maintenance at the selected speed despite current fluctuations tending to affect it; to facilitate and maintain accurate factory adjustment, or user's readjustment, between the speed-governing handle and the mechanical governor-parts to insure performance substantially accordant with the speed-indicating scale; and to give the requisite range of speed variation; to associate the motor starting switch and table-brake mechanisms for proper related functioning and also to relate the table and gearing so that table-brake-failure may not endanger the gearing; and in other and further particulars to improve generally and in detail the associated mechanisms of the drive.

In the drawings wherein I have illustrated a specific embodiment of my invention for purposes of full disclosure, Fig. 1 is a plan view of the drive equipment, with the record table removed, and with its trip-mechanism associated with the tone-arm; Fig. 2 is an end elevation of the construction shown of Fig. 1; with the record table in place; Fig. 3 is a front elevation with parts broken away; Fig. 4 is an inverted plan view; Fig. 5 is a section on line 5—5 of Fig. 4; Fig. 6 is a detached detail of governor appliances; Fig. 7 is a section on line 7—7 of Fig. 6; Fig. 8 is a section on line 8—8 of Fig. 6, and Fig. 9 is a sectional detail of the table-mounting.

In general it will at once be apparent from the drawings that on the frame or bed-plate 10 all of the mechanisms are mounted; that the suspended motor 11, through horizontal shaft 12, worm-drives the vertical shaft 13 for the record-table 14 above the plate; that this vertical table-shaft 13 worm-drives a horizontal governor shaft 15 through whose governor speed-control is effected according to the setting of the governor-handle 16, above the plate; that the braking or release of the turntable is effected by brake-structure 17 the release latch 18 of which is subject to semi-automatic control from the tone-arm 19 through a trip mechanism 20, and that starting or stopping of the electric motor is controlled by a switch 21 below the plate.

The motor 11, designed for a normal speed of say 1080 R. P. M., is mounted directly on the underside of the plate 10 and communicates its drive directly to shaft 12 through the somewhat flexible coupling 12' of known type, shaft 12 finding thrust bearing in the end lug 22 and support in the bearing sleeves 23 provided in the hollow gear-casing 24 that depends from and is screwed to the bed plate 10. The table-shaft 13, stepped in this gear casing, is worm-driven from shaft 12, the latter having a machine-thread worm 25 cut therein and the shaft 13 having pinned to it a corresponding machine-thread worm-wheel 26. Governor shaft 15, that is worm-driven from the table shaft 13, may preferably have a higher speed than the motor shaft which parallels it and therefore is preferably driven from a second worm wheel 27 mounted above the first and having a different number of teeth. This wheel coacts with the worm 28 cut in the shaft 15 that finds bearing in the lugs 29, 29', of the frame, and for requisite sensitiveness to control this latter worm is of the under-cut-tooth variety. Shaft 15 carries the governor structure 30 of known type that comprises a friction disc 31 slidable on the shaft, a collar 32 fixed on the shaft and the usual ball-laden governor springs 33 connecting the collar and the disc-hub. A governor to be operated by governor handle 16, cooperates with the disc 31, but preferably there is corelated with this brake another one to act upon the motor shaft 12. Thus, fixed to the motor shaft 12 is a disc 32, preferably of somewhat larger diameter than disc 31 and preferably lying in the same or a parallel plane, and the two friction pads 34, 34' for cooperation with the margins of these discs, respectively, are mounted on opposite ends of a rocker arm 35 that is pivoted as at 35' to a governor-brake-lever 36 which in turn is pivoted at 37 to the plate 10, preferably near the vertical plane through shaft 12 and which is normally retracted as by spring 38. Between lever 36 and rocker arm 35 a light spring 39 is connected, tending to hold the pad 34 on the front end of the rocker away from the governor disc 31 and lightly to touch the pad 34' upon the motor shaft disc 32 even when the brake-lever is retracted. Thus it is insured that the governor disc 31 is left entirely free, when the machine is idle, whatever may be the position of the governor-handle 16, insuring that the motor may start with facility; whereas even the lightest pressure on the governor disc (since the motive power is transmitted thereto through two worms) tends detrimentally to prevent prompt starting or "pick-up" of the motor. A light touch of the pad 34' on the motor shaft disc has no detrimental effect on account of the direct drive thereto, and in practice I find the motor to start perfectly with the construction stated. When the governor shaft seeks to attain full speed, however, and the friction pad 34 cooperates with its disc 31, the pressure engendered acts on both of the discs, through the arrangement of the rocker arm 35, taking strain off of the governor, tending directly to check the motor shaft, and giving such delicacy of control and such promptness of response to movement of the handle 16 as to produce almost instantaneous reflection of the handle-movements in the speed of the table. In practice relatively short adjustments of the handle 16, made while a record is running, produce such quick response that to the auditor there is little or none of the customary slur between pitches of the music or voice that ordinarily attend speed adjustment while a talking machine is running.

Of course the governor-handle 16 has crank connection beneath the plate 10 with the governor lever 36, and the handle 16 cooperates with a customary scale 40 that may be marked with speed-indicating graduations 40'. It is important that the connection between handle 16 and the governor mechanism be so established, and so readily adjustable, that scale-indicated table-speed (particularly around the normal 80 R. P. M. speed) and the actual performance of table shall tally. I prefer so to gear the vertical shaft to the motor shaft so that at the normal speed of the former (i. e., 80 R. P. M.) the motor will be running at say 40 revolutions below its rated speed, giving a leeway to take care of voltage-drop in the supply line and I prefer that under these conditions the gearing shall drive the governor shaft at about 1250 R. P. M. In setting, or readjusting for these preferred conditions, the handle 16 is arbitrarily set at 80, the governor lever 36 is hand-moved to establish the requisite table-shaft speed (per a speed indicator temporarily applied thereto) and then an adjustable element of operative-connection between the two levers is fixed in its proper adjustment. For this connection the adjustable link 41 is employed, made in two overlapping flat sections, one pivoted to a crank 42 of the handle 16 and the other pivoted to the end of governor lever 36, the two overlapped sections being adjustably connected by the screw and slot arrangement 43 and the link being preferably guided between rails 44 formed on the underside of the plate.

The table 14 is preferably quite a heavy metal plate, for flywheel effect, and its mounting, the provision for its braking and the co-relation of the brake mechanism with the motor switch, are preferably organized in a manner that is particularly advantageous in connection with the provision of an electric motor as the prime mover and the arrangement of the sensitive and adequate governing mechanism above described.

The table-brake 17 above the plate 10 may be the usual bell-crank lever with a finger-piece 45 and a brake-pad arm 46 to work against the periphery of the table, the hub-shoulder 47 coacting with the latch member 18 under the effect of spring 48 in known fashion and the latch lever being conveniently subject to semi-automatic control by the trip arm 20, the adjustable prong 49 whereof coacts with the pin 50 on the swinging tone arm 19, also in known fashion. The shaft 51, turning with the brake-lever, however, carries below the said plate 10 the movable contact arm of the motor-switch 21 and is arranged to open the motor-switch before the brake is applied, and to unbrake the table before closing the motor-switch. This advantageously insures that the motor may not receive current until the table is free to rotate, nor after the table has been braked, but it makes possible the careless manual operation of the brake lever to leave the table free from braking effect after the motor circuit has been opened and the motor stopped. Therefore, and for other advantages, the table 14 is rotatively loose on the shaft 13, and only frictionally carried in rotation therewith. In this connection it will be understood that the simple machine-toothed worm and gear connection 25—26 between the motor shaft and the table shaft, while effectively giving best driving power, is practically incapable of transmitting motion from the wheel to the worm and therefore, were the table 14 fixed to shaft 13 heavy strain would be thrown on the worm gearing were the table allowed to travel unbraked after the motor stops. In the specific construction shown the table shaft 13 has secured thereto near its upper end a cupped carrier or support 53 on the annular horizontal rim of which the table 14 normally bears, the extremity of the shaft extending loosely into the downwardly protruding hub 14′ of the table, which is recessed from above as at 54 to receive the spring 55, which, in turn is maintained in contact with the base of the recess by the bottom flange of the record-shank 13′ screwed onto the end of shaft 13, such spring insuring maintenance of an adequate frictional connection for normal rotation of the table synchronously with the table shaft. Thus if one oscillates the table by hand; tries to turn it backward; or leaves it free from brake-restraint while stopping the motor, no damaging strains are thrown on the drive mechanism because of the frictional connection.

It will be noted that not only is the construction above described advantageous in its corelation of functions to secure best performance under the conditions imposed by electric motor drive, but that in the mechanism structure, the mounting, and the interconnection of the parts, advantageous simplicity, manufacturing economy, smallness of size, and disposition of the parts for accessibility and lubrication are of distinct merit.

I claim:

1. In a machine of the character described, the combination of a table shaft, a drive shaft and a governor shaft, provision for worm-driving the table shaft from the driving shaft and the governor shaft from the table shaft, a governor on the governor shaft having a brake-receptive element, a brake-receptive element on the drive shaft, and speed-governing-brake means coacting with both said brake-receptive elements.

2. In a machine of the character described, the combination of a table shaft, a drive shaft and a governor shaft, provision for worm-driving the table shaft from the driving shaft and the governor shaft from the table shaft, a governor on the governor shaft having a brake-receptive element, a brake-receptive element on the drive shaft, and speed-governing-brake means coacting with both said brake-receptive means, comprising a shiftable lever and a rocker arm pivoted to said lever and having on opposite sides of the pivot two brake-pads for respective cooperation with said two brake-receptive means.

3. In a drive of the character described, the combination of a drive shaft, having a brake-receptive disc, a governor shaft having a governor thereon and a governor-shiftable brake-disc, a table shaft and provision for worm-driving said table shaft from the drive shaft and worm-driving the governor shaft from the table shaft, a pivoted main governor lever, a rocker lever pivoted on said main lever and bearing on opposite arms brake pads for the two respective brake-discs, and yielding means normally tending to tilt said rocker lever away from the brake disc of the governor.

4. In a drive of the character described, the combination of an electric motor, a shaft directly driven thereby bearing a brake-member rotatable therewith, a table shaft, worm gearing having machine threads between the drive shaft and the table shaft, a governor shaft having an undercut worm, geared to the main shaft, said shaft carrying a governor having a movable brake-receptive surface, a rocker lever having pads for respective coaction with said two brake surfaces of the governor and the drive shaft, a main governor lever pivotally carrying said rocker lever, a spring interposed between said two levers tending to rock said rocker lever to effect brake contact with the drive shaft brake surface and out of contact with the governor brake surface, and a handle for moving the main governor lever.

5. In a drive of the character described, the combination of an electric motor, a shaft directly driven thereby bearing a brake-member rotatable therewith, a table shaft, worm gearing having machine threads between the drive shaft and the table shaft, a governor shaft having an undercut worm, geared to the main shaft, said shaft carrying a governor having a movable brake-receptive surface, a rocker lever having pads for respective coaction with said two brake surfaces of the governor and the drive shaft, a main governor lever pivotally carrying said rocker lever, a spring interposed between said two levers tending to rock said rocker lever to effect brake contact with the drive shaft brake surface and out of contact with the governor brake surface, and means for moving the main governor lever, comprising a handle and quick-adjustment link-connection between the handle and the main governor lever.

6. In a drive of the character described, a base, table shaft, means for driving the table shaft, a governor acting on the table shaft, governor lever, a hand-lever cooperating with a scale, and operative connections between said hand lever and governor lever comprising a two-part link and quick-adjustment connection between the parts of said link.

LOUIS P. VALIQUET.